United States Patent [19]

Kobayashi et al.

[11] 4,115,338
[45] Sep. 19, 1978

[54] METALLIC TONE COATING COMPOSITION

[75] Inventors: Sadao Kobayashi, Yokohama; Yasuo Okita, Oiso, both of Japan

[73] Assignee: Mitsui Toatsu Kagaku Kabushiki Kaisha (Mitsui Toatsu Chem., Inc.), Tokyo, Japan

[21] Appl. No.: 668,728

[22] Filed: Mar. 19, 1976

Related U.S. Application Data

[63] Continuation-in-part of Ser. No. 488,583, Jul. 12, 1974, abandoned.

[30] Foreign Application Priority Data

Jul. 16, 1973 [JP] Japan .............................. 48-80056

[51] Int. Cl.² .......................... C08J 3/20; C08K 3/00; C08K 3/08; C08K 5/00

[52] U.S. Cl. ................ 260/29.4 UA; 260/42.14; 260/42.22; 260/29.2 UA; 260/42.53; 260/29.2 EP; 260/29.2 TN; 260/29.2 E; 260/29.2 R; 260/29.4 R; 260/29.6 R; 260/29.6 NR; 260/29.6 RB; 260/31.2 N; 260/31.2 XA; 260/31.2 R; 260/31.4 R; 260/31.4 ER; 260/32.8 N; 260/32.8 EP; 260/32.8 R; 260/33.4 R; 260/33.4 EP; 260/33.4 UR; 260/33.6 R; 260/33.6 EP; 260/33.6 UB; 260/33.6 UA; 260/33.8 R; 260/40 R; 260/33.8 EP; 260/33.6 UA; 260/37 EP; 260/39; 260/33.8 EP; 260/39 R

[58] Field of Search ............... 260/42.14, 42.22, 42.53, 260/33.6 UA, 33.6 R, 33.4 R, 31.4 R, 31.2 R, 32.8 R, 29.2 M, 29.2 TN, 29.2 EP, 29.4 UA, 29.6 RB, 29.6 NR, 33.8 R, 33.8 UA, 29.4 R

[56] References Cited

U.S. PATENT DOCUMENTS

| | | | |
|---|---|---|---|
| 2,302,361 | 11/1942 | Yngve | 260/42.14 |
| 2,876,133 | 3/1959 | Iler et al. | 260/42.14 |
| 3,265,644 | 8/1966 | Herman et al. | 260/42.14 |
| 3,272,772 | 9/1966 | Russell | 260/42.14 |
| 3,393,165 | 7/1968 | Evans et al. | 260/42.53 |
| 3,661,620 | 5/1972 | Dekking et al. | 260/42.53 |
| 3,806,464 | 4/1974 | Matrick et al. | 260/42.14 |
| 3,971,753 | 7/1976 | Frechtling et al. | 260/42.53 |

Primary Examiner—Allan Lieberman
Attorney, Agent, or Firm—Daniel William J.

[57] ABSTRACT

A metallic tone coating composition which comprises a coating resin, a polymer-encapsulated metal powder containing a metal component in an amount between 0.1 part by weight and 50 parts by weight, inclusive per 100 parts by weight of the coating resin and a solvent or dispersion medium. This coating composition is excellent in stability and provides a coating film with excellent film characteristics including excellent durability and beautiful appearance.

3 Claims, No Drawings

METALLIC TONE COATING COMPOSITION

This application is a continuation-in-part of application Ser. No. 488,583, filed July 12, 1974, and now abandoned.

BACKGROUND OF THE INVENTION

This invention relates to a metallic tone coating composition which is excellent in stability and capable of affording a coating film having good durability.

Hitherto, a variety of metal powders such as powders of aluminum, copper, iron and various alloys have been used for a metallic tone coating composition. Among them, aluminum powder is used most frequently. In the case of using aluminum powder, the surface thereof is usually protected by coating a fatty acid such as oleic acid or stearic acid to prevent the aluminum powder from causing a dust explosion which may occur when uncoated powder is scattered. However, a metallic tone coating composition prepared by using aluminum powder treated with a fatty acid, involves several problems; the treated aluminum powder in the coating composition is liable to sediment and once sedimented, is difficult to redisperse. Depending on the type of coating resin used, aluminum ions which are produced by dissolution of aluminum tend to react with the resin, resulting in increased viscosity or gelatin of the paint composition. Such a paint composition thus lacks stability as required for a useful paint. Metallic tone coating compositions prepared by using other kinds of metal powder such as copper powder, also have the same defect in the coating, composition containing aluminum powder; viz. the copper powder is liable to sediment and once sedimented, the powder in the coating composition changes the color of the composition or reacts with the resin, thus causing gelation of the coating composition.

When using powders of an alloy consisting of metals with different ionization tendencies or a mixture of at least two different kinds of metal powder, ionization of the metal is significantly promoted so that the coating composition increases in viscosity and gelation of the coating composition becomes conspicuous. Such coating compositions also have the defects that the color of the metal powder is changed due to the action of an alkali or acid present in the resin and when packed in an air-tight container for transportation, the container will be deformed due to the inner pressure of hydrogen gas evolved therein. In addition, a coating film obtained by using a conventional metallic tone paint is insufficient in resistance against water and chemicals such as acids and alkalis. Especially if the coating compositions are used outdoors, the higher the content of the metal, the quicker the luster will be lost.

As a result of much research carried out in order to overcome such drawbacks of conventional metallic tone paints, it has now been found that the afore-mentioned drawbacks can be overcome by preparing a metallic tone coating composition which contains a specific amount of a metal powder, the surface of which has been treated in a special manner. This invention is based on this finding.

BRIEF SUMMARY OF THE INVENTION

It is an object of this invention, in paints using a solvent or dispersion medium, to provide a stable solvent- or dispersion type paint which permits neither coagulation of the paint itself nor precipitation of a metal powder.

It is another object of this invention to provide a metallic tone coating composition capable of affording a coating film having good durability.

DETAILED DESCRIPTION OF THE INVENTION

According to this invention, the afore-mentioned objects can readily be achieved by using a metallic tone coating composition which comprises (a) a coating resin, (b) a polymer-encapsulated metal powder composite material containing a metal component in an amount between 0.1 part by weight and 50 parts by weight, inclusive, per 100 parts by weight of the coating resin solids and (c) a solvent or dispersion medium.

Any of the coating resins conventionally used for metallic tone paints can be used as the coating resin recited in (a). Moreover, those resins which are rich in functional groups capable of reacting with metals to normally cause increase in viscosity or gelation and thus have not yet been used conventionally for metallic tone paints, can also be used as the coating resin. Illustrative of such resins are acrylic resins, alkyd resins, oil-free alkyd resins, vinyl chloride resins, urethane resins, unsaturated polyester resins, melamine resins, urea resins and epoxy resins. They may be used singly or in combination. The reins may be dissolved in a solvent or dispersed into a dispersion medium.

The polymer-encapsulated metal powder composite material which is the component (b) used in the composition of this invention, is a substance wherein not only is the surface of the individual metal powders physically coated, but the polymer and the metal are combined with each other by a certain chemical bond. Accordingly, this substance cannot be separated by solvents into the resin and metal components. The polymer-encapsulated metal powder composite material is prepared by subjecting the surface of the metal powder to an acid treatment, activating the surface by neutrlization with an alkali, adding a vinyl monomer to the metal powder with the activated surface and then subjecting the mixture to a polymerization reaction.

The acid used for this purpose may be a mineral acid such as sulfuric acid, phosphoric acid, hydrochloric acid or nitric acid or an organic acid such as acetic acid, stearic acid, oleic acid, terephthalic acid or orthophthalic acid.

Typical examples of the alkali used for this purpose include caustic soda, caustic potash and ammonia water. In case the acid treatment is carried out with phosphoric acid, the activation treatment can be effected without using such alkaline reagent.

The polymerization reaction is carried out by dispersing the metal powder in water and/or an organic solvent. In this case, a conventional organic peroxide or azo compound can be used as a radical polymerization initiator. The use of a water-soluble organic peroxide such as tertbutyl permaleate or succinic acid peroxide or a water-soluble azo compound such as 2,2'-azo-bis(2-amidinopropane) hydrochloride yields a particularly desirable capsulated metal powder. Hydrogen peroxide, cumene hydroperoxide and a combination of hydrogen peroxide and l-ascorbic acid are also effective radical initiators.

The afore-mentioned vinyl monomer is a compound which has a vinyl bond in the molecule and is capable of radical polymerization or copolymerization. Illustrative of such vinyl monomers are styrene, alphamethylstyrene, vinyltoluene, acrylonitrile, methacrylonitrile, vinyl acetate, vinyl propionate, etc. For the uses where weather-resistance is required, however, acrylic acid, acrylic esters, methacrylic acid and methacrylic esters are desirable. More specific examples of the acrylic esters include methyl acrylate, ethyl acrylate, n-butyl acrylate, 2-ethylhexyl acrylate, lauryl acrylate, stearyl acrylate, hydroxyethyl acrylate, phosphates of hydroxyethyl acrylate, hydroxypropyl acrylate, methoxyethyl acrylate, butoxyethyl acrylate, cyclohexyl acrylate and glycidyl acrylate. Illustrative of the methacrylic esters are methyl methacrylate, ethyl methacrylate, isobutyl methacrylate, n-butyl methacrylate, tert-butyl methacrylate, 2-ethylhexyl methacrylate, lauryl methacrylate, stearyl methacrylate, oleyl methacrylate, methoxyethyl methacrylate, ethoxyethyl methacrylate, butoxyethyl methacrylate, hydroxyethyl methacrylate, phosphates of hydroxyethyl methacrylate, hydropropyl methacrylate, cyclohexyl methacrylate, glycidyl methacrylate, beta-methylglycidyl methacrylate, diethylaminoethyl methacrylate and gamma-methacryloxypropyl trimethoxysilane. These acids and esters may be used in combination with the other types of vinyl monomers mentioned above.

Examples of the metal powder include aluminum, brass, bronze, stinless steel and copper, with aluminum being most preferable. The shape of the metal powder used in the composite material may be any of scaly, fibrous, rod-like, acicular, granular and spherical structures and can suitably be selected therefrom according to the desired metallic tone appearance of the coating film.

In the polymer-encapsulated metal powder composite material used in this invention, the polymer and the metal do not merely adhere to each other physically, but are bound by a certain chemical bond. This fact can be confirmed by the method as will be stated hereunder.

A polymer derived from the vinyl polymer used for the preparation of the composite material and contained therein, is extracted in a Soxhlet extractor with a solvent which can dissolve the polymer. A liquid which does not dissolve the polymer but is miscible with the solvent is then added to the extract. If there is found any precipitate, it will be so-called free polymer not combined with the metal powder, which is then collected by filtration and dried to find its weight. On the other hand, the extraction residue containing the metal powder is dried, placed on a thermobalance and the decrease in weight on heating at temperatures from normal temperature to 500° C in a nitrogen stream is measured. If the polymer is combined chemically with the metal powder, the extraction residue will exhibit a decrease in weight at temperatures of 200°–500° C between which the polymer is thermally decomposed.

The proportion of the polymer combined with the metal powder can be varied according to the conditions for preparing the composite material, especially the amount of the vinyl monomer used. In the composite material used in this invention wherein the polymer and the metal powder are combined chemically, the quantity of the combined polymer is preferably between 0.2 parts by weight and 20 parts by weight, inclusive, per 100 parts by weight of the metal powder.

Generally, in case the combined polymer content exceeds 20 parts, the dispersibility of the obtained polymer-encapsulated metal powder is deteriorated.

If the combined polymer content is less than 0.2 parts, the encapsulation in the obtained polymer-encapsulated metal powder is incomplete. It is desirable that the amount of the free polymer is as small as possible.

In the composition of this invention, it is necessary that 0.1–50 parts by weight of the aforesaid polymer-encupsulated metal powder composite material is used per 100 parts by weight of the solid matter of the coating resin. The use of the composie material is an amount of 1–10 parts by weight is especially preferable. If the amount of the composite material becomes less than 0.1 part by weight, metallic luster generally required for metallic tone paints will no longer be satisfactory. On the other hand, if the composite material is used in an amount of more than 50 parts by weight, the amount of the metal powder in the coating composition will become to excessive for a smooth coating operation so that the resulting coating film will be inferior in various characteristics. Thus, the use of an extremely small or large amount of the metal powder is not practical. In addition to the metal powder, any of the pigments conventionally used for paints may be added to the composition of this invention.

Examples of the solvent or dispersion medium utilizable as the component (c) in the composition of this invention include aromatic compounds such as toluene and xylene, olefin compounds, cycloolefin compounds, solvent naphtha, alcohols such as methanol, ethanol, isopropanol and n-butanol, ester compounds such as ethyl acetate and butyl acetate, ketone compounds such as methyl ethyl ketone and methyl isobutyl ketone, chlorinated compounds such as trichloroethane, monoethermonoesters of glycols such as ethylene glycol monobutylether acetate, and water. These solvents or dispersion media are used preferably in the form of a mixture of at least two. The composition of the solvent in this case is determined taking into consideration such factors as the solubility of the coating resin, dispersibility of the pigment, film-forming characteristics, temperature of the coating operation, etc.

The use of the coating composition of this invention wherein the polymer-encapsulated metal powder composite material is used and its amount is controlled to an extent of 0.1–50 parts by weight per 100 parts by weight of the solid matter of the coating resin, brings about the following advantages. As compared with the conventional metallic tone paints, the coating composition of this invention is significantly improved in stability, chemical-resistance, water-resistance and weather-resistance and moreover, attains improvement in appearance and quality of the resultant coating film. Thus, the coating composition of this invention has excellent properties as a practically valuable metallic tone coating composition. More particularly, the coating composition of this invention brings about the following advantages in connection with stability. Since the surface of the individual metal powders is coated with the polymer, they have a high affinity for the coating resin or solvent and show a slow sedimentation rate in a solvent into which aluminum powder is easily dispersable. Even if the coated metal powder does become sedimented in the paint, it can easily be re-dispersed. Because dissolution of the metal in the paint is prevented, no bridging reaction will take place between metal ions and functional groups in the coating resin such as carboxyl groups. The use of the polymer-encapsulated metal powder serves to inhibit an increase in viscosity and gelation even in the case of a coating resin which would otherwise cause a increase in viscosity or gelation when admixed with the metal powder.

In connection with the improvement in the properties of the coating film, the coating composition of this invention has the following merits. Since the surface of the metal powder is coated with the polymer and since the reactive and thus corrosion-susceptible part of the metal is combined with the polymer, the coating film obtained by using the coating composition of this invention is indeed outstanding in chemical-resistance (in particular, acid-resistance and alkali-resistance), water-resistance and weather-resistance as compared with the paint film obtained by using the known conventional metallic tone paint.

In connection with improvement in appearance and quality of the coating film, the coating composition of this invention has the following advantages. Since the polymer-encapsulted metal powder composite material has a good affinity for the coating resin, the luster of the resulting coating film is markedly improved. It is also possible to produce delicate color tones by using a variety of alloys or to obtain a metallic tone paint film with a new tint by using a mixture of at least two kinds of metal powder. Thus, it is evident that the coating composition of this invention is of a high practical value, particularly in that the composition is stable and easy to handle during application and provides a coating film having good stability and appearance, as compared with the conventional paints.

The invention will be more clearly understood with reference to the following Examples.

EXAMPLE 1

A coating resin was prepared by continuously adding 1,000 g. of a mixture of 68% methyl methacrylate, 18% n-butyl acrylate, 10% hydroxy-ethyl methacrylate, 2% methacrylic acid and 2% benzoyl peroxide to 1,000 g. of xylene over a period of 2 hours and then maintaining the reaction temperature of the mixture at 90° C for 3 hours. The resin solution thus prepared had a viscosity of U (at 25° C) in terms of Gardner's viscosity ratings and an acid number of 8.0 and contained 49.5% of a non-volatile matter. Besides this resin, an n-butylated melamine resin named U-ban 20 SE (manufactured by Mitsui-Toatsu; a non-volatile matter 50%) was also used.

On the other hand, aluminum powder (manufactured by Toyo Aluminum; 1109 MA) was washed four times with acetone and dried until no further decrease in weight of the aluminum powder occurred as confirmed by a thermobalance in a nitrogen sream at temperatures up to 500° C. 100 Grams of the washed aluminum powder were suspended in a medium consisting of 800 g. of water and 100 g. of methanol. To this suspension were added 11 g. of methyl methacrylate and 1 g. of a phosphoric ester of hydroxyethyl acrylate. 100 Grams of water containing 0.5 g. of 2,2'-azo-bis-(2-amidinopropane) hydrochloride were added to the suspension under agitation and the reaction was conducted at 50° C for 2 hours. The reaction product was collected by filtration and dried to obtain 111.4 g. of a polymer-encapsulated aluminum powder. 20 Grams of the polymer-encapsulted aluminum powder were extracted with methyl ethyl ketone at 80° C for 15 hours in a Soxhlet extractor whereby the loss of weight was found to be 0.55 g. When 98 mg. of the extracted aluminum powder were placed on a thermobalance, the decrease in weight at temperatures between 200° C and 400° C was found to be 7.68%. These results show that about 73% of the polymer was combined chemically with the aluminum powder.

160 Grams of the coating resin obtained above were mixed with 40 g. of the amino resin and 4 g. of the polymer-encapsulated aluminum powder composite material. To the mixture was added a solvent which was a mixture of 50% xylene, 40% ethyl acetate and 10% n-butanol until the mixture was diluted to have a viscosity of 70 KU in terms of Stormer viscosity, which is a usual value for conventional metallic tone paints, whereby a coating composition was prepared.

To make this coating composition suitable for spray coating, the coating composition was further diluted with a solvent of the above-mentioned recipe until the viscosity in terms of flow-out time as measured according to the Ford Cup No. 4 became 16 seconds at 20° C. The paint thus prepared was sprayed on an iron panel and baked for 30 minutes at 140° C to make a coating film for testing.

COMPARATIVE EXAMPLE 1

A coating film was made by first preparing a coating composition in a manner similar to that described in Example 1 except that an oleic acid-treated aluminum powder was used in place of the polymer-encapsulated aluminum powder composite material, and then spraying and baking the coating composition in a similar manner.

The results of tests are tabulated in Table 1, which obviously shows that the coating composition of this invention is far superior to that of the conventional one in stability and in the properties of the resulting coating film.

Table 1

| Test items | Example | Comparative Example 1 |
|---|---|---|
| Sedimentation rate of the aluminum powder | very slow | relatively fast |
| Increase in viscosity of the coating composition | none | significant |
| Re-dispersibility of the aluminum powder | very good | somewhat poor |
| Immersion of the coating film in 5% H$_2$SO$_4$ at 20° C for a day | coating film very good | coating film good |
| Immersion of the coating film in 5% NaOH at 20° C for a day | coating film very good | coating film good |
| Luster (brilliancy) | good | somewhat poor |

EXAMPLE 2

A coating resin was prepared by continuously adding 1000 g. of a mixture of 75% methyl methacrylate, 23% n-butyl acrylate, 2% methacrylic acid and 1% benzoyl peroxide to 400 g. of toluene over a period of 2 hours and then maintaining the reaction temperature of the mixture at 90° C for 3 hours. The resin solution thus prepared had a viscosity of Z$_3$ (25° C) in terms of Gardner's viscosity ratings and an acid number of 7.5 and contained 49.8% of a non-volatile matter. To 80 parts by weight of this coating resin were added 50 parts by weight of a 20% solution of ½CAB (cellulose acetate butyrate manufactured by Eastman Chemical) in ethyl acetate, 10 parts by weight of dibutyl phthalate and 4 parts by weight of the polymer-encapsulated aluminum powder composite material prepared in Example 1. The mixture was diluted with a solvent consisting of 50% by weight of xylene and 50% by weight of ethyl acetate to have a viscosity of 70 KU in terms of Stormer viscosity whereby a coating composition was obtained. In the case of spray coating, the composition was further diluted with the above-mentioned solvent until the viscosity in terms of flow-out time as measured according to the Ford cup No. 4 became 14 seconds at 20° C. The paint thus prepared was sprayed on an iron panel and allowed to stand at room temperature for a week to make a coating film for testing.

COMPARATIVE EXAMPLE 2

A coating film was made by first preparing a coating composition in a manner similar to that described in Example 2 except that an oleic acid-treated aluminum powder was used instead of the polymer-encapsulated aluminum powder composite material, and then spraying and baking the coating composition in a similar manner.

The results of tests are tabulated in Table 2. As is evident from the data given in the table, the coating composition of this invention showing a slower sedimentation rate of the aluminum powder composite material, a negligible increase in viscosity of the paint, better re-dispersibility of the aluminum powder and better chemical-resistance of the resultant coating film is superior to that of Comparative Example 2.

COMPARATIVE EXAMPLE 3

A coating film was made in the same manner as described in Example 1 except that the polymer-encapsulated aluminum powder composite material alone was used in an amount of 0.05 part by weight. The resulting film was found insufficient in luster of aluminum necessary for a metallic tone paint and thus unsuited for practical use.

COMPARATIVE EXAMPLE 4

When 55 parts by weight of the afore-mentioned polymer-encapsulated aluminum powder composite material alone was added in the same manner as described in Example 1, the viscosity of the resulting slurry was increased and a putty-like material was obtained, which was difficult to handle and was thus judged unsuitable for practical use.

Table 2

| Test items | Example 2 | Comparative Example 2 |
|---|---|---|
| Sedimentation rate of the aluminum powder | slow | very fast |
| Increase in viscosity of the coating composition | none | increase observed |
| Re-dispersibility of the aluminum powder | good | very bad |
| Immersion of the coating film in 5% $H_2SO_4$ at 20° C for a day | coating film very good | coating film good |
| Immersion of the coating film in 5% NaOH at 20° C for a day | coating film very good | coating film good |
| Luster (brilliancy) | very good | very good |

EXAMPLE 3

Effect of treatment on the surface of a metal:

The conditions for treating the surface of a metal are shown in Table 3. The metal was treated under the specified conditions and a monomer was added thereto. The mixture was stirred and then a polymerization initiator was added. The sorts and quantities of such monomer and polymerization initiator are also shown in Table 3. The mixture was then subjected to a polymerization reaction conducted under the specified conditions. The yield of the resulting product was calculated from the increase in weight of the product and the amount of the monomer added.

Among the products obtained, those containing aluminum powder were subjected in accordance with the method described below for examining the water-resisting property. The water-resisting time was evaluated in accordance with the above method by the number of days required for collecting 20 ml of a gas evolved during the test.

In the case of the product containing copper powder, the samples were dipped into an 0.5% aqueous solution of sodium sulfide and the water-resisting time was evaluated by the length of time required for making the blackish tint of the sample deeper than that of copper powder in a blank test.

Water-resisting test;

In a test tube was placed 0.5 g (net as aluminum metal) of each sample (prepared in the foregoing 1-1 to 1-7). Ten grams of an aqueous solution having a pH value of 10 were then placed in the test tube. The tube was sealed with a rubber stopper having a pore through which a polyethylene tube communicating to a gas-collecting tube was penetrated. The gas-collecting tube was a scaled lean and long glass tube one terminal end of which was sealed and the other terminal end of which was opened so that a rubber stopper having two pores might be mounted thereto. The gas-collecting tube was charged with pink colored water (water was colored for facilitating visual observation) and the open end was blocked with the two-pored rubber stopper. Through one of the pores was penetrated the polyethylene tube communicating to the test tube in which the aluminum powder sample was placed. The gas-collecting tube was then immersed into a water bath in such a manner that the lower open end was under the bath level and the upper sealed end above the bath level was supported vertically to the bath level.

(When the test tube in which the aluminum powder sample was placed was dipped into a water bath kept at 50° C, evolution of hydrogen gas from the sample began and the evolved gas was introduced through the polyethylene tube into the gas-collecting tube whereby the pink colored water in the tube was expelled by the introduced gas from the tube and flowed into the water bath through the other pore provided in the rubber stopper. The volumetric amount of gas in the tube was measured occasionally with the lapse of time and recorded.)

Results obtained in the above experiments are shown together with the reaction conditions in Table 3. This table shows that by the surface treatment, dispersion of the aluminum or copper powder into the reaction system is improved to form a homogeneous slurry. In the case of control (not subjected to the surface treatment), the metal powders were agglomerated around bubbles or floated on the liquid so that a homogeneous slurry could not be formed. In addition, the untreated metal powders were not sufficiently protected in their surface area. Especially in the case of untreated aluminum powder, violent evolution of a gas was observed after dispersion of the powder into the reaction system but before encapsulation of the powder with a polymer so that there was no way but to interrupt the reaction on the way to escape from danger. Although various kinds of monomers were used in this test, the yield of the product was affected by the sorts of initiators rather than the kinds of monomers.

With respect to the water-resisting time of the product containing aluminum powder, the samples of the cited references were within one hour while the samples of this invention were 7 days in the shortest time. As an example of the extreme cases, the samples of this invention include one (Exp. No. 1 in Table 3) which permits no evolution of gas even after the lapse of 300 days.

As the method for collecting hydrogen gas cannot be adopted for a test for examining the water-resisting property of samples containing copper powder unlike the case of samples containing aluminum powder, sodium sulfide was used for examining the water-resisting property of the samples containing copper powder by visually observing the loss in brilliance of copper caused by the reaction between copper and sulfide ion of the sodium sulfide. In the case of the samples of this invention, 5 days were required for allowing the brilliance of copper to be lost. In either case of aluminum powder and copper powder, their water-resisting property can be remarkably improved by combining a preliminary treatment of the powder with an acid, an alkali or phosphoric acid with an encapsulation treatment of the powder with a polymer. It was also found that if such preliminary treatment was omitted, the effect of encapsulation with a polymer would not be expected.

It should be noted that the abbreviations used in Table 3 have the following meanings:

(i) MMA : Methyl methacrylate
(ii) HEMA : Hydroxyethyl methacrylate
(iii) ST : Styrene
(iv) TMPTMA : Trimethylolpropane trimethacrylate
(v) V-50 : 2,2'-azo-bis(2-amidinopropane)hydrochloride.

Table 3

Preparation of the polymer-encapsulted metal powders according to this invention and properties of the product

| Exp. No. | | 1 | 2 | 3 | 4 | 5 | 6 | Comparative 7 | This Invention 8 | Comparative 9 |
|---|---|---|---|---|---|---|---|---|---|---|
| Metal powder | Sort | Al | Al | Al | Al | Al | Al | Al | Cu | Cu |
| | Amount used (g) | 25 | 25 | 25 | 25 | 25 | 25 | 25 | 25 | 25 |
| Conditions for Surface treatment | Acid Sort | Phosphoric acid | HCl | Sulfuric acid | Acetic acid | Phosphoric acid | Phosphoric acid | — | Phosphoric acid | — |
| | Amount used (g) | | | | | | | | | |
| | Alkali Sort | 1% solution NaOH | 1% solution NaOH | 1% solution Caustic potash | 5% solution Ammonia | 1% solution Washing only with water | 1% solution Washing only with water | — | 1% solution NaOH | — |
| | Amount used (g) | Amount to adjust pH to 7 | Amount to adjust pH to 7 | Amount to adjust pH to 7 | Amount to adjust pH to 7 | Amount to adjust pH to 7 | Amount to adjust pH to 7 | — | Amount to adjust pH to 7 | — |
| | Temp. (°C) | Room temp. | Room temp. | Room temp. | 40 | Room temp. | Room temp. | — | Room temp. | — |
| | Time (min.) | 10 | 10 | 5 | 10 | 10 | 10 | — | 10 | — |
| Reaction liquid Amount used (g) | | water 300 | water 300 | water 300 | water 300 | water 300 | water 300 | water 300 | water 300 | water 300 |
| Dispersion state of the powder into the reaction liquid | | Good | Good | Good | Good | Good | Good | Floating matter found | Good | Floating matter found |
| Evolution of gas (just after dispersion of the powder into the reaction liquid) | | Not recognized | Not recognized | Not recognized | Not recognized | Not recognized | Not recognized | Violent | Not recognized | Not recognized |
| Monomer | Sort Amount | MMA HEMA 4 0.4 | MMA HEMA 4 0.4 | MMA HEMA 4 0.4 | MMA HEMA 4 0.4 | ST 5.0 | ST TMPTMA 4.1 1.0 | MMA HEMA 4.0 0.4 | MMA HEMA 4.0 0.4 | MMA HEMA 4.0 0.4 |
| Polymerization initiator | Sort | V-50 | 1-Ascorbic acid/H₂O₂ | 1-Ascorbic acid/H₂O₂ | 1-Ascorbic acid/H₂O₂ | V-50 | t-butyl permaleate | V-50 | V-50 | V-50 |
| | Amount used (g) | 0.5 | 0.66/1.8 | 0.66/1.8 | 0.66/1.8 | 0.5 | 2.0 | 0.5 | 0.5 | 0.5 |
| Reaction conditions | Temp. (°C) | 65 | 30 | 30 | 30 | 65 | 65 | 65 | 65 | 65 |
| | Time (Hr) | 3 | 3 | 3 | 3 | 3 | 3 | | 3 | 3 |
| Yield of the product (%) | | 87.3 | 78.4 | 77.5 | 77.6 | 52.4 | 71.0 | Gas was violently evolved from the aluminum powder and the polymerization could not be continued | 89.4 | 88.7 |
| Water-resisting time of the product (days) | | more than 300 | 95 | 20 | 7 | 30 | 45 | | 5 | 30 min. |

What is claimed is:

1. A metallic tone resin coating composition comprising
   a. a coating resin selected from the group consisting of an acrylic resin, alkyd resin, vinyl chloride resin, urethane resin, unsaturated polyester resin, melamine resin, urea resin, epoxy resin or a combination thereof;
   b. for each about 100 parts by dry weight of said coating resin about 0.1–50 parts by weight of particles of a polymer-encapsulated metal powder obtained by activating a metallic powder by treatment with 1) an organic or mineral acid followed by neutralization of the thus-treated powder with an alkali, or 2) an aqueous solution of phosphoric acid or a phosphoric acid ester of an acrylate; and subjecting the thus-activated metallic powder to in situ polymerization in an aqueous medium of at least one vinyl monomer in the presence of a radical polymerization initiator, the amount of such vinyl monomer being such as to form about 0.2–20 parts by weight of said encapsulating polymer per 100 parts of said metallic powder, said metallic powder being at least one of aluminum, brass, bronze, stainless steel, or copper; and
   c. a solvent or dispersion medium of the group consisting of toluene, xylene, solvent naphtha, methanol, ethanol, isopropanol, n-butanol, ethyl acetate, butyl acetate, methyl ethyl ketone, methyl isobutyl ketone, trichloroethylene, ethyleneglycol monobutyl ether acetate, water or a combination thereof.

2. A composition according to claim 1 wherein a vinyl monomer used for polymer-encapsulation of said metal powder is styrene, alphamethylstyrene, vinyltoluene, acrylonitrile, methacrylonitrile, vinyl acetate, vinyl propionate, acrylic acid, methacrylic acid, methyl acrylate, ethyl acrylate, n-butyl acrylate, 2-ethylhexyl acrylate, lauryl acrylate, stearyl acrylate, hydroxyethyl acrylate, a phosphoric ester of hydroxyethyl acrylate, hydroxypropyl acrylate, methoxyethyl acrylate, butoxyethyl acrylate, cyclohexyl acrylate, glycidyl acrylate, methyl methacrylate, ethyl methacrylate, isobutyl methacrylate, n-butyl methacrylate, tert-butyl methacrylate, 2-ethylhexyl methacrylate, lauryl methacrylate, stearyl methacrylate, oleyl methacrylate, methoxyethyl methacrylate, ethoxyethyl methacrylate, butoxyethyl methacrylate, hydroxyethyl methacrylate, a phosphoric ester of hydroxyethyl methacrylate, hydroxypropyl methacrylate, cyclohexyl methacrylate, glycidyl methacrylate, beta-methylglycidyl methacrylate, diethylaminoethyl methacrylate or gamma-methacryloxypropyl(trimethoxy)silane or a combination thereof.

3. A composition according to claim 1 wherein said polymer-encapsulated metal powder composite material is the one obtained by encapsulation of said metal powder with said polymer of said vinyl monomer, said encapsulation being carried out by polymerizing said vinyl monomer in the presence of a radical polymerization initiator which is 2,2'-azo-bis-(2-amidinopropane) hydrochloride, tert-butyl permaleate, succinic acid peroxide, a combination of hydrogen peroxide and 1-ascorbic acid, or cumene hydroperoxide.

* * * * *